(12) United States Patent
Jung et al.

(10) Patent No.: US 8,885,824 B2
(45) Date of Patent: Nov. 11, 2014

(54) RIGHT OF INDIVIDUAL PRIVACY AND PUBLIC SAFETY PROTECTION VIA DOUBLE ENCRYPTED LOCK BOX

(75) Inventors: Edward K. Y. Jung, Bellevue, WA (US); Royce A. Levien, Lexington, MA (US); Richard T. Lord, Tacoma, WA (US); Robert W. Lord, Seattle, WA (US); Mark A. Malamud, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/385,598

(22) Filed: Jul. 12, 2012

(65) Prior Publication Data
US 2014/0019744 A1    Jan. 16, 2014

(51) Int. Cl.
| | |
|---|---|
| H04N 5/76 | (2006.01) |
| H04L 9/08 | (2006.01) |
| H04N 21/4405 | (2011.01) |
| H04N 17/06 | (2006.01) |
| H04N 1/32 | (2006.01) |

(52) U.S. Cl.
CPC ........ *H04L 9/0836* (2013.01); *H04N 21/44055* (2013.01); *H04N 1/32272* (2013.01)
USPC ............ 380/212; 386/291; 386/323; 386/362

(58) Field of Classification Search
CPC combination set(s) only.
See application file for complete search history.

(56) References Cited

U.S. PATENT DOCUMENTS

| | | | |
|---|---|---|---|
| 7,508,941 B1 | 3/2009 | O'Toole, Jr. et al. | |
| 7,512,814 B2 | 3/2009 | Chen et al. | |
| 2007/0297607 A1 | 12/2007 | Ogura et al. | |

OTHER PUBLICATIONS

U.S. Appl. No. 13/653,222, Edward K.Y. Jung et al.

(Continued)

*Primary Examiner* — Venkat Perungavoor

(57) ABSTRACT

A method substantially as shown and described the detailed description and/or drawings and/or elsewhere herein. A device substantially as shown and described the detailed description and/or drawings and/or elsewhere herein. The referenced method and device including but not limited to at least a part of: a machine including but not limited to: a machine configured to create a physical reality of accepting an output of a surveillance device; a machine configured to create a physical reality of encrypting at least a part of the output of the surveillance device with a level-one encryption key whose decryption key is inaccessible by a level-one encryption entity; a machine configured to create a physical reality of transmitting a level-one encrypted output of the surveillance device; a machine configured to create a physical reality of receiving the level-one encrypted output of the surveillance device; a machine configured to create a physical reality of encrypting at least a part of the level-one encrypted output of the surveillance device with a level-two encryption key whose decryption key is inaccessible by a level-two encryption entity; a machine configured to create a physical reality of transmitting a level-two encrypted output of the surveillance device; a machine configured to create a physical reality of receiving the level-two encrypted output of the surveillance device; a machine configured to create a physical reality of storing the level-two encrypted output of the surveillance device in association with a surveillance device identifier in a form inaccessible by a pre-event repository; a machine configured to create a physical reality of transmitting the level-two encrypted output of the surveillance device in response to a query containing at least a part of the surveillance device identifier in the form inaccessible by the pre-event repository; a machine configured to create a physical reality of receiving the level-two encrypted output of the surveillance device; a machine configured to create a physical reality of decrypting at least a part of the level-two encrypted output of the surveillance device with a level-two decryption key inaccessible by the level-two encryption entity; a machine configured to create a physical reality of transmitting a level-one encrypted output of the surveillance device that is a result of said decrypting at least a part of the level-two encrypted output of the surveillance device with a level-two decryption key inaccessible by the level-two encryption entity; a machine configured to create a physical reality of receiving the level-one encrypted output of the surveillance device; a machine configured to create a physical reality of decrypting at least a part of the level-one encrypted output of the surveillance device with a level-one decryption key inaccessible by a level-one encryption entity; and a machine configured to create a physical reality of presenting an unencrypted output of the surveillance device. And related methods.

43 Claims, 24 Drawing Sheets

(56) References Cited

OTHER PUBLICATIONS

U.S. Appl. No. 13/677,634, Edward K.Y. Jung et al.
U.S. Appl. No. 13/660,848, Edward K.Y. Jung et al.
U.S. Appl. No. 13/664,265, Edward K.Y. Jung et al.
U.S. Appl. No. 13/707,427, Edward K.Y. Jung et al.
U.S. Appl. No. 13/708,651, Edward K.Y. Jung et al.
U.S. Appl. No. 13/720,360, Edward K.Y. Jung et al.
U.S. Appl. No. 13/724,941, Edward K.Y. Jung et al.
U.S. Appl. No. 13/731,751, Edward K.Y. Jung et al.
Bai et al.; "An Advanced Efficient Secured Blind Authentication and Verification Crypto Protocol"; International Journal of Future Generation Communication and Networking; bearing a date of Sep. 2011; pp. 87-94; vol. 4, No. 3; located at www.serse.org/journals/IJFGCN/vol4_no3/8.pdf.
Camenisch et al.; Blind and Anonymous Identity-Based Encryption and Authorised Private Searches on Public Key Encrypted Data; total of 19 pages; printed on Oct. 29, 2012; located at http://www.iacr.org/archive/pke2009/54430202/54430202.pdf.
"Can I encrypt user input in a way I can't decrypt it for a certain period of time?"; stackexchange, Cryptography beta; pp. 1-5; printed on Oct. 29, 2012; located at http://crypto.stackexchange.com/questions/2507/can-i-encrypt-user-input-in-a-way-i-cant-decrypt-it-for-a-certain-period-of-tim.
"Debunking the Myths of Column-level Encryption"; total of 6 pages; bearing a date of 2012; printed on Oct. 29, 2012; Vormetric, Inc.; located at http://www.vormetric.com/resources/white-papers/wp-myths-of-column-level-encryption.pdf.
Doukas et al.; "A Blind Source Separation Based Cryptography Scheme for Mobile Military Communication Applications"; WSEAS Transactions on Communications; bearing a date of Dec. 2008; pp. 1235-1245; Issue 12, vol. 7; located at http://www.academia.edu/413382/_J19_,_A_Blind_Source_Separation_Based_Crypto_graphy_Scheme_for_Mobile_Military_Communication_Applications.
Gallegos-Garcia et al.; Identity based Threshold Cryptography and Blind Signatures for Electronic Voting; bearing a date of Jan. 2010; pp. 62-71; Issue 1, vol. 9; WSEAS Transactions on Computers; located at http://www.wseas.us/e-library/transactions/computers/2010/89-164.pdf.

Khiyal et al.; Dynamic Blind Group Digital Signature Scheme in E-Banking; International Journal of Computer and Electrical Engineering; bearing a date of Aug. 2011; pp. 514-519; vol. 3, No. 4; located at: www.ijcee.org/papers/371-E959.pdf.
Kwon et al.; "Protecting Secret Keys with Blind Computation Service"; printed on Oct. 29, 2012; pp. 1-11; Seoul National University; Seoul, Korea; located at http://citeseerx.ist.psu.edu/viewdoc/summary?doi=10.1.1.19.1902.
Lorimer, William R.; "Double Blind Comparisons: A New Approach to the Database Aggregation Problem"; bearing a date of May 16, 2011; total of 2 pages; Computer Science > Cryptography and Security, Cornell University Library; located at http://arxiv.org/abs/1105.3239.
Motro et al.; "Blind Custodians: A Database Service Architecture that Supports Privacy without Encryption"; bearing a date of 2005; printed on Oct. 29, 2012; pp. 338-352; volume-issue number LNCS 3654; IFIP International Federation for Information Processing; located at: http://cs.gmu.edu/~ami/research/publications/pdf/dbsec05.pdf.
Motro et al.; "Blind Custodians: a database service architecture that supports privacy without encryption"; ACM Digital Library; printed on Oct. 30, 2012; total of 2 pages; George Mason University; Springer-Verlag Berlin, Heidelberg; located at http://dl.acm.org/citation.cfm?id=2138957.
"Proofpoint DoubleBlind™ Key Architecture"; bearing a date of 2012; printed on Oct. 29, 2012; total of 2 pages; ProofPoint, Inc.; Sunnyvale, CA; located at http://www.proofpoint.com/datasheets/email-archiving/DS-Proofpoint-DoubleBlind-Key-Architecture.pdf.
"Proofpoint Enterprise Archive: DoubleBlind™ Key Architecture"; printed on Oct. 30, 2012; total of 2 pages; located at http://www.proofpoint.com/products/archive/doubleblind-key-architeture.php.
Schonberg et al.; "On Blind Compression of Encrypted Correlated Data Approaching the Source Entropy Rate"; total of 10 pages; printed on Oct. 29, 2012; U. of California, Berkeley; located at http://sdraper.ece.wise.edu/researchDir/pdf/allerton05_encryt.pdf.
Slik, David; "Vanishing Into the Infrastructure"; bearing a date of Jun. 29, 2009; printed on Oct. 29, 2012; total of 3 pages; Blogspot; located at http://intotheinfrastructure.blogspot.com/2009/06/where-does-encryption-fit-in-cloud.html.

FIGURE 1 is inclusive of:
| Fig. 1-A | Fig. 1-B | Fig. 1-C | Fig. 1-D | Fig. 1-E | Fig. 1-F |
| Fig. 1-G | Fig. 1-H | Fig. 1-I | Fig. 1-J | Fig. 1-K | Fig. 1-L |
| Fig. 1-M | Fig. 1-N | Fig. 1-O | Fig. 1-P | Fig. 1-Q | Fig. 1-R |
| Fig. 1-S | Fig. 1-T | Fig. 1-U | Fig. 1-V | Fig. 1-W | Fig. 1-X |
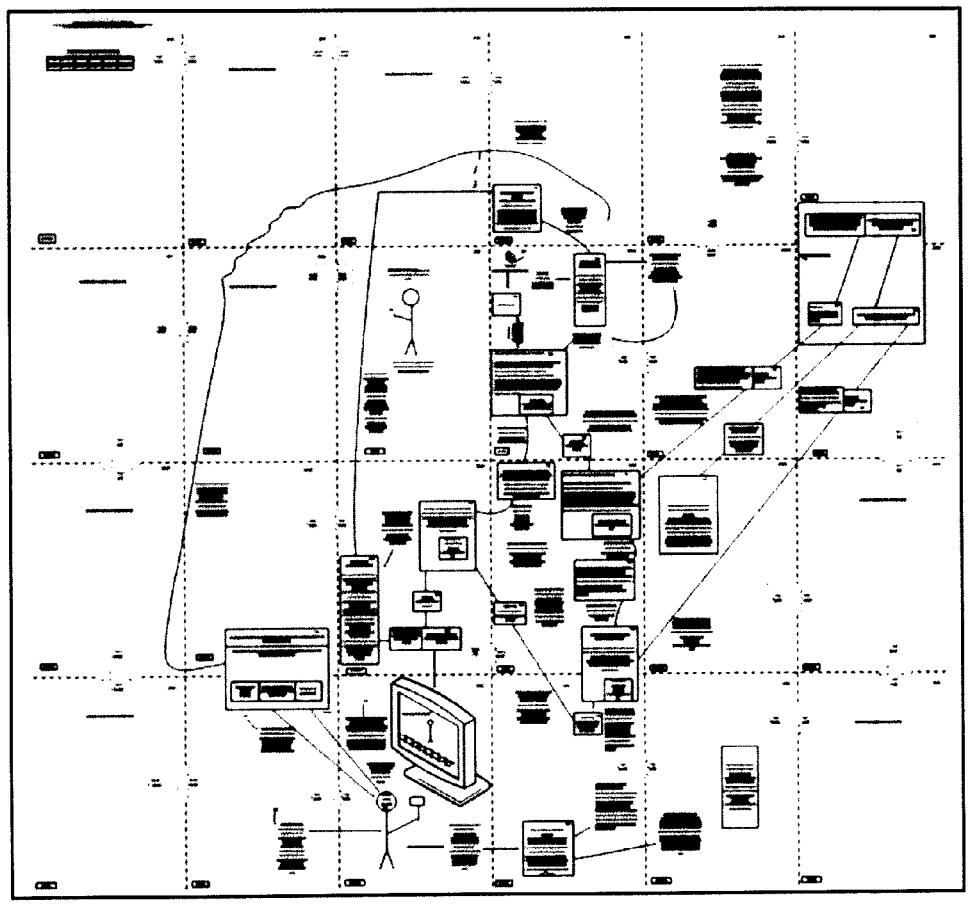
Fig. 1-A This page is a partial view of a complete view that is extended over several sheets. This page is included so that there is no loss in facility of understanding the view. See 37 C.F.R. 1.84(h)(2). This page is capable of being linked edge to edge with Fig. 1-A to the left, Fig. 1-C to the right, Fig. 1-H below, and no figure above.

To the right direction, this line passes through Figs. 1-C and 1-D in directional flow order, ultimately terminating at modules 104/106 of Fig. 1-D To the downward/left direction, this line passes through Fig. 1-H, ultimately terminating at module 163 of Fig. 1-N

Fig. 1-B

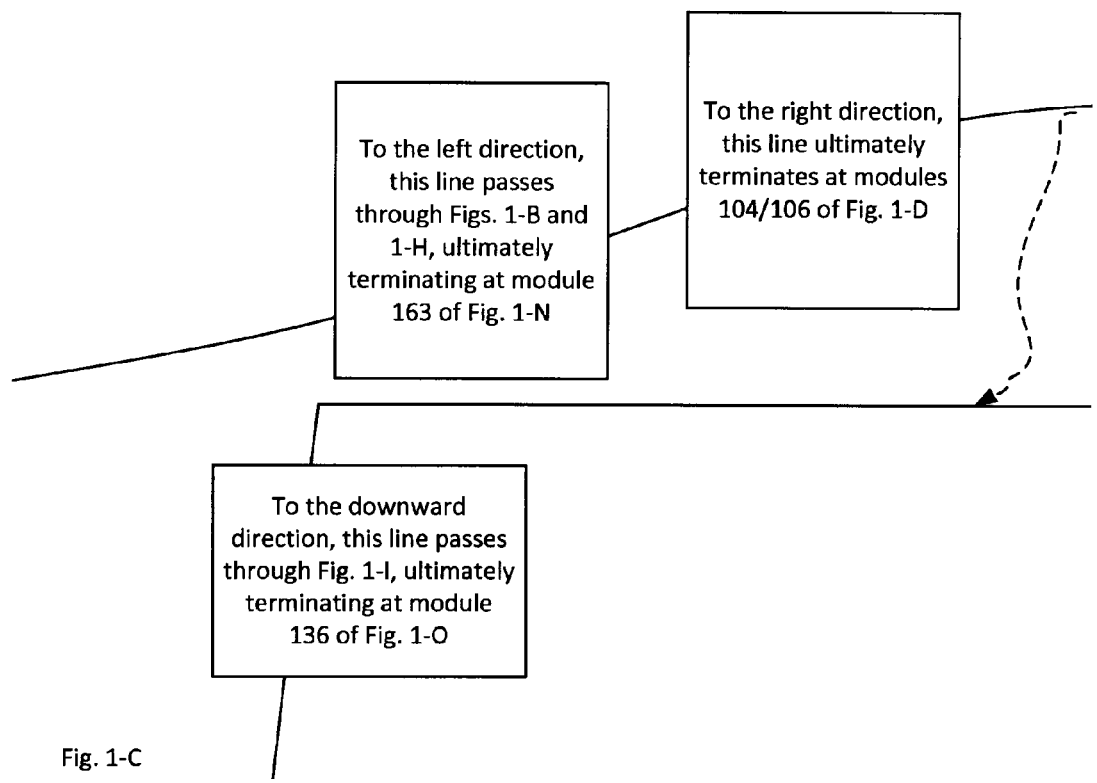
Fig. 1-C

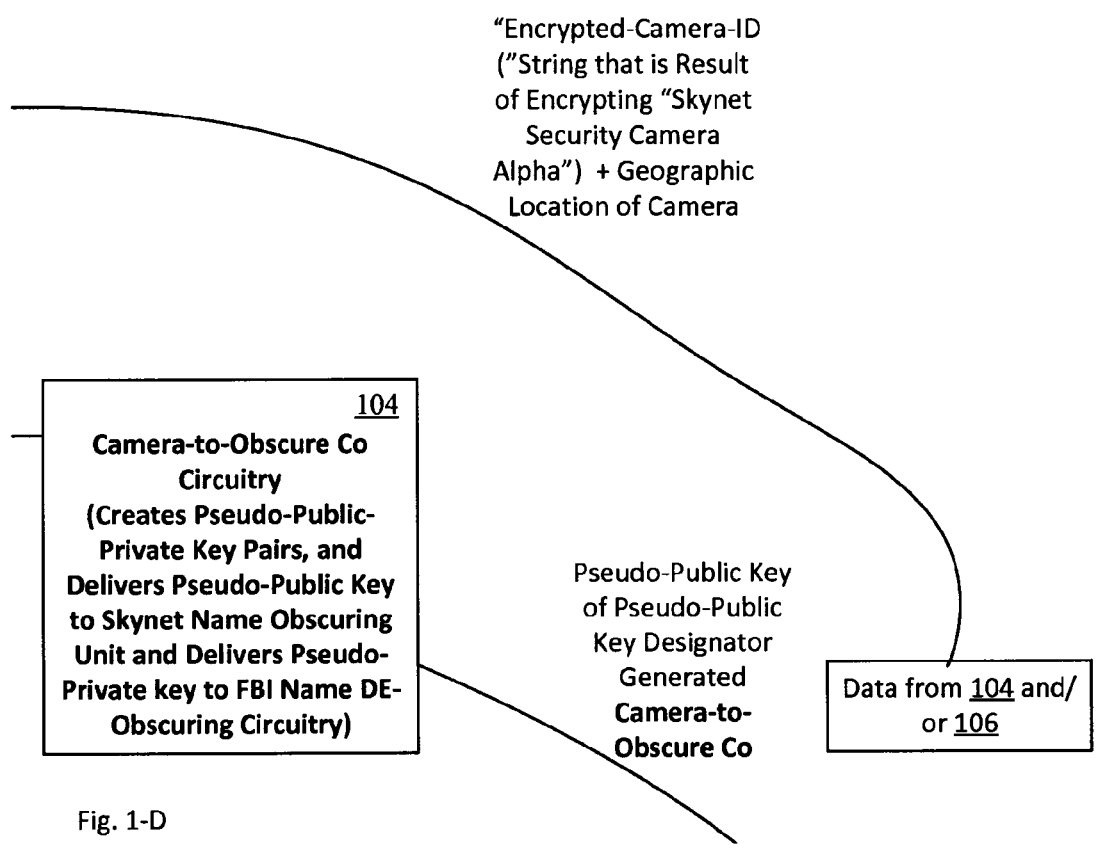
Fig. 1-D

Note_1: Cameras in general. Privacy in cameras. This idea was you could attach a camera to the equivalent of a lockbox where it is recording you entering a store and you are somehow made aware that everything is encrypted the moment it is recorded, so it is never kept in the clear anywhere. The first time it is viewable is after the double encryption under control of the government.

Note_2: In various embodiments, "Encrypted-Camera-ID" could be outside/inside first encryption/second encryption/etc.; but perhaps best that it stay outside encryption

Fig. 1-E

Fig. 1-F
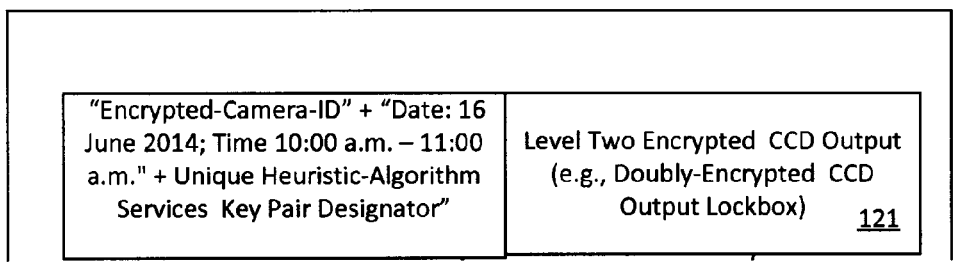

This page is a partial view of a complete view that is extended over several sheets. This page is included so that there is no loss in facility of understanding the view. See 37 C.F.R. 1.84(h)(2). This page is capable of being linked edge to edge with Fig. 1-A above, Fig. 1-H to the right, Fig. 1-M below, and no figure to the left.

Fig. 1-G

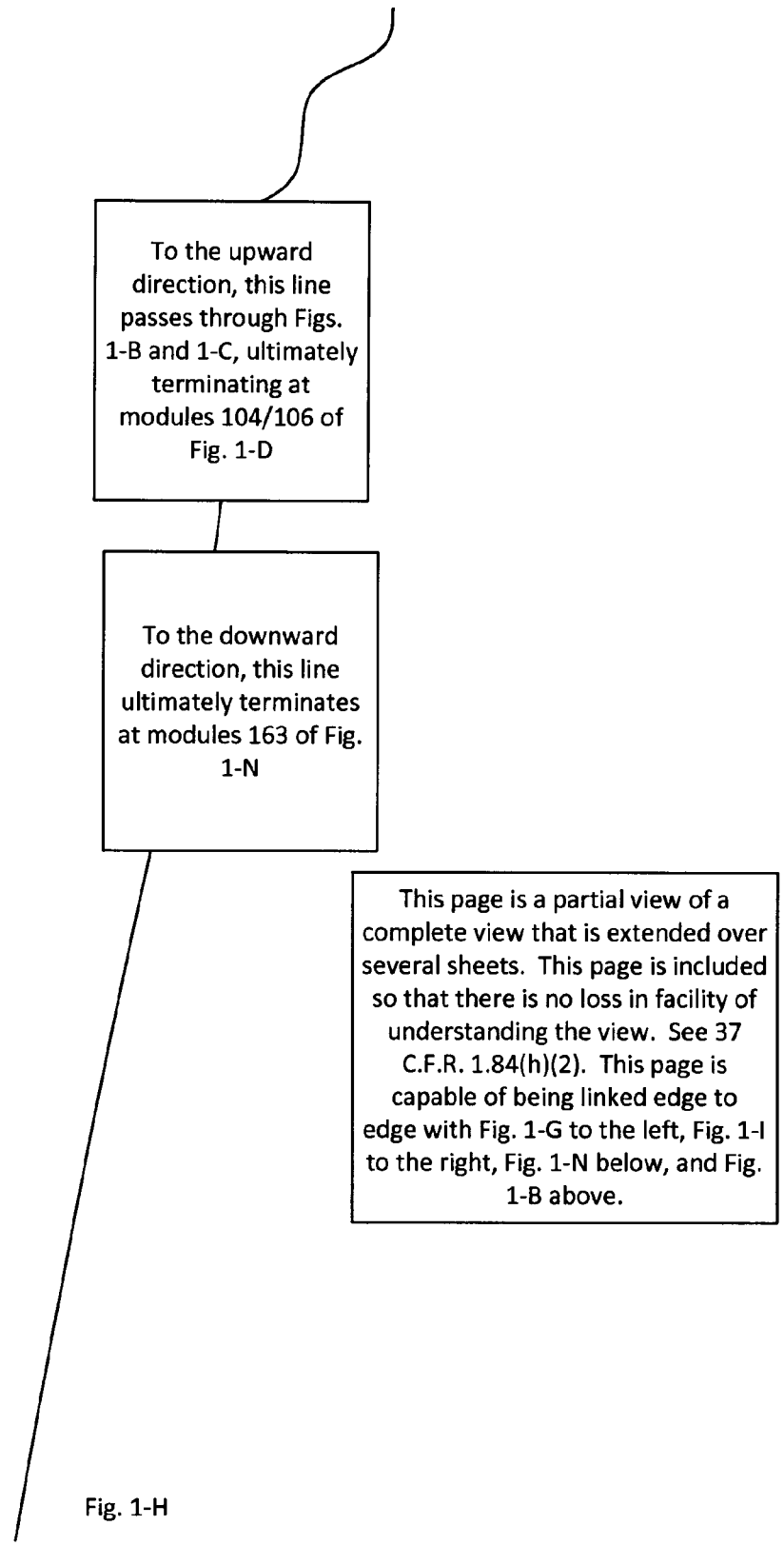

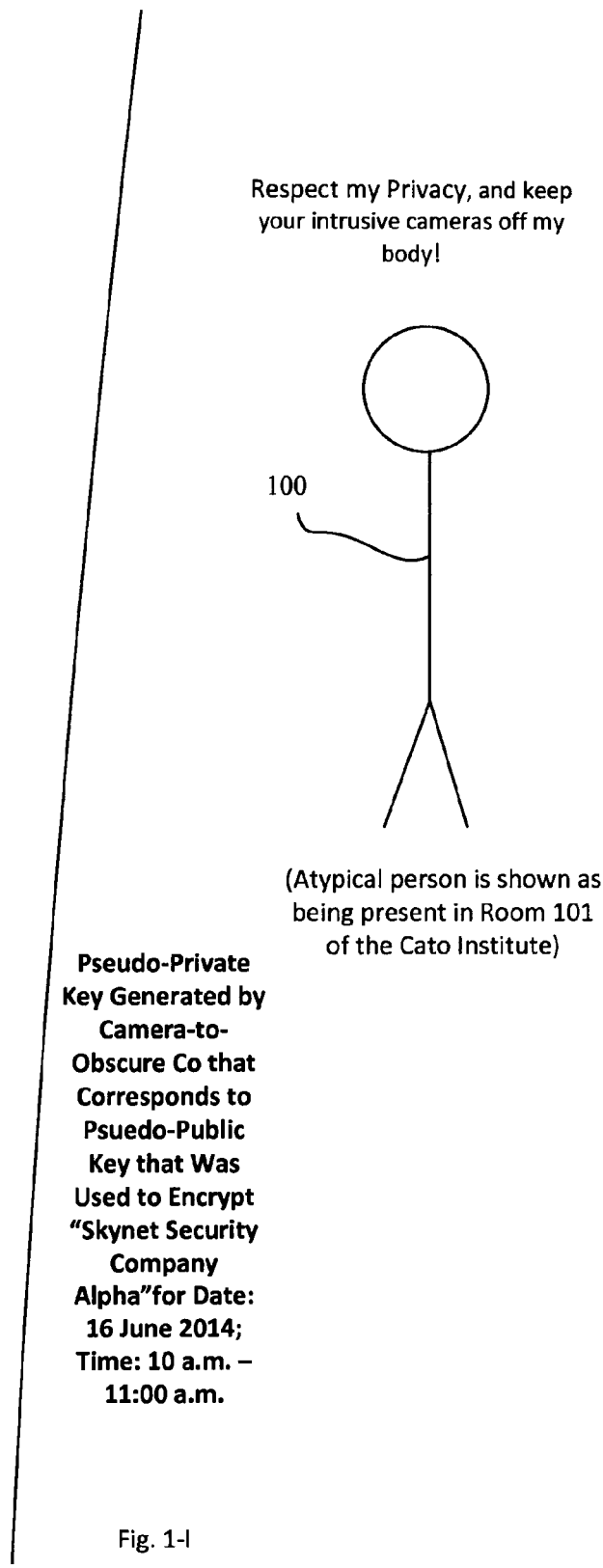
Fig. 1-I

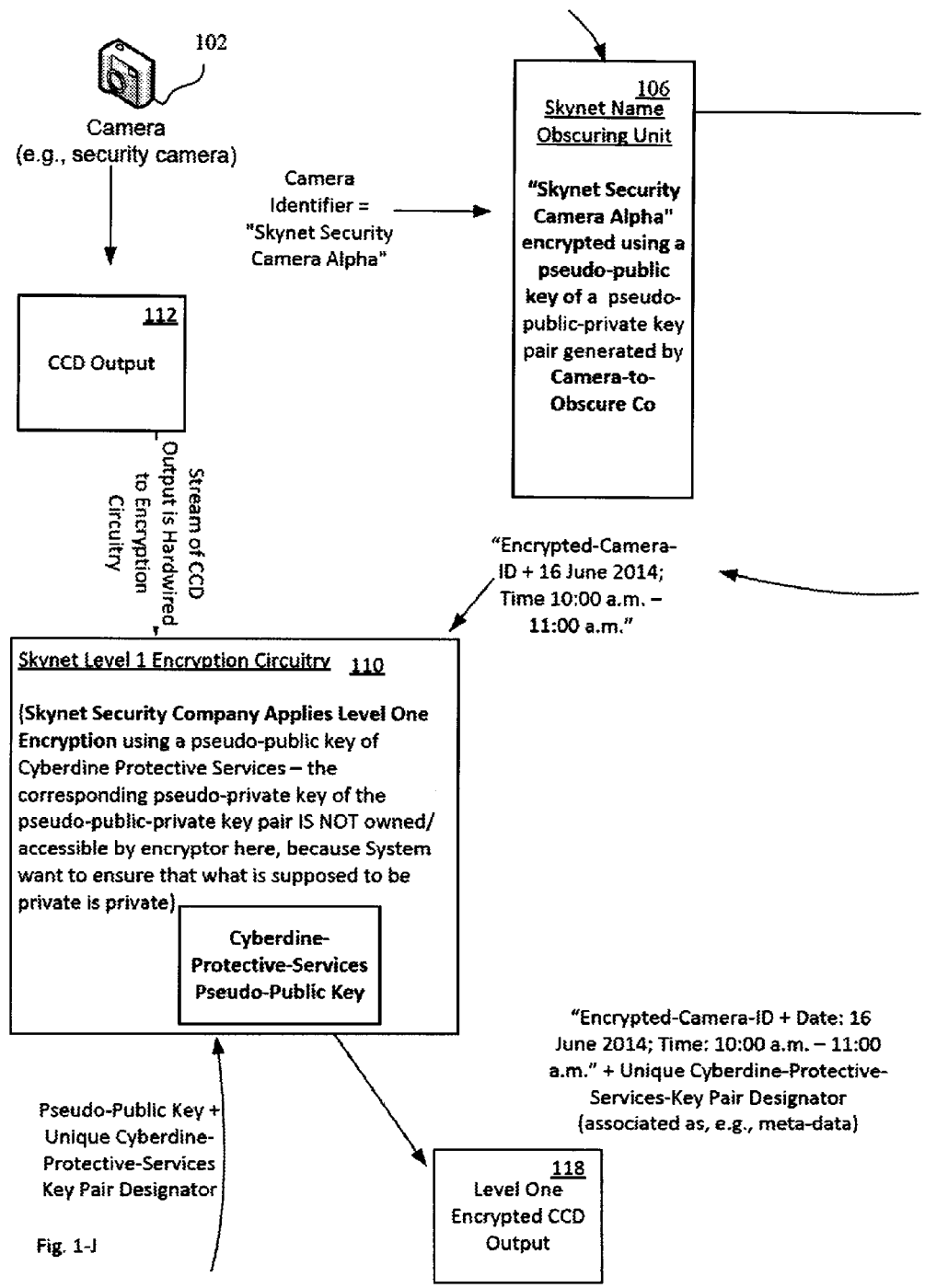

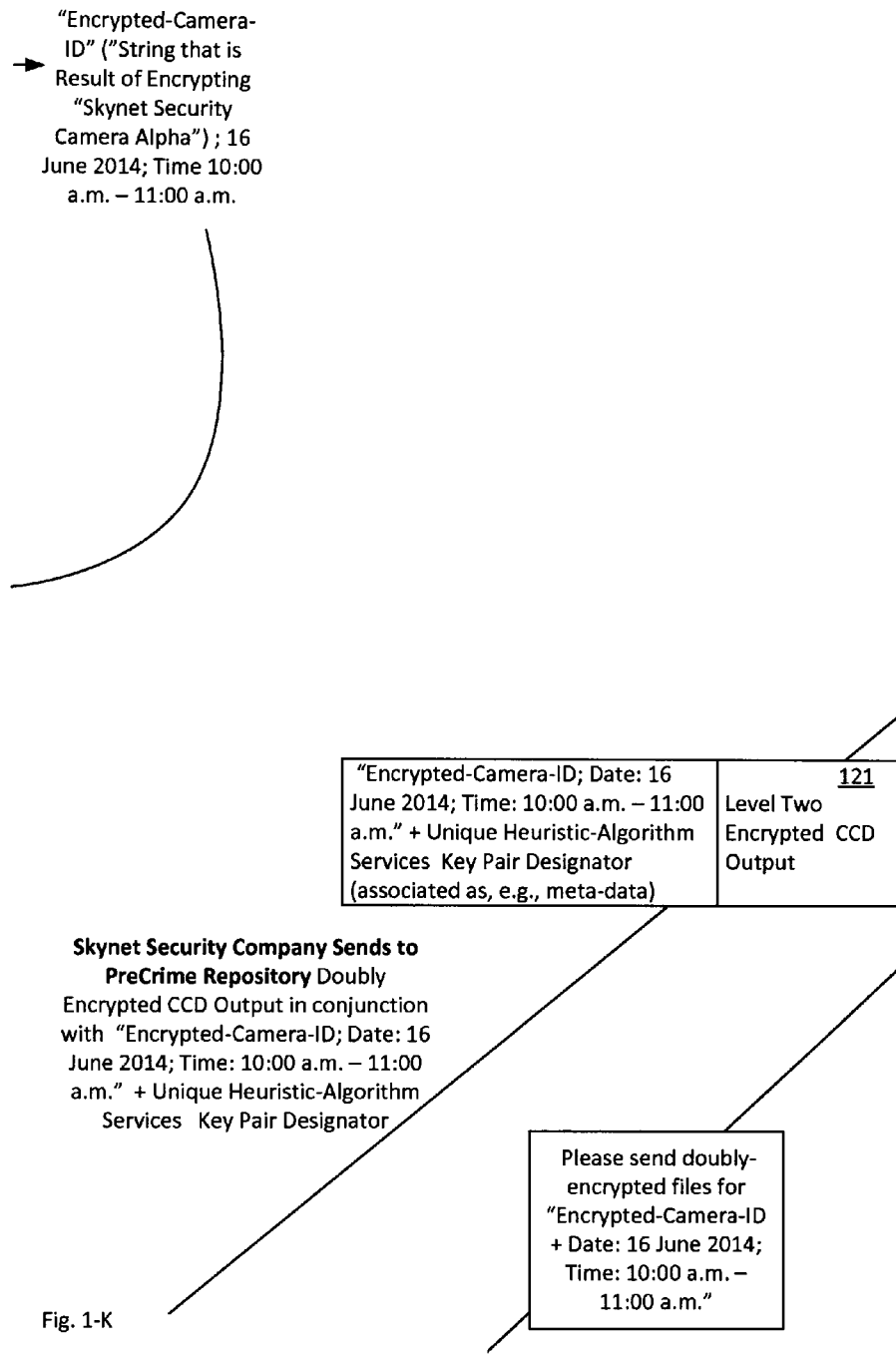

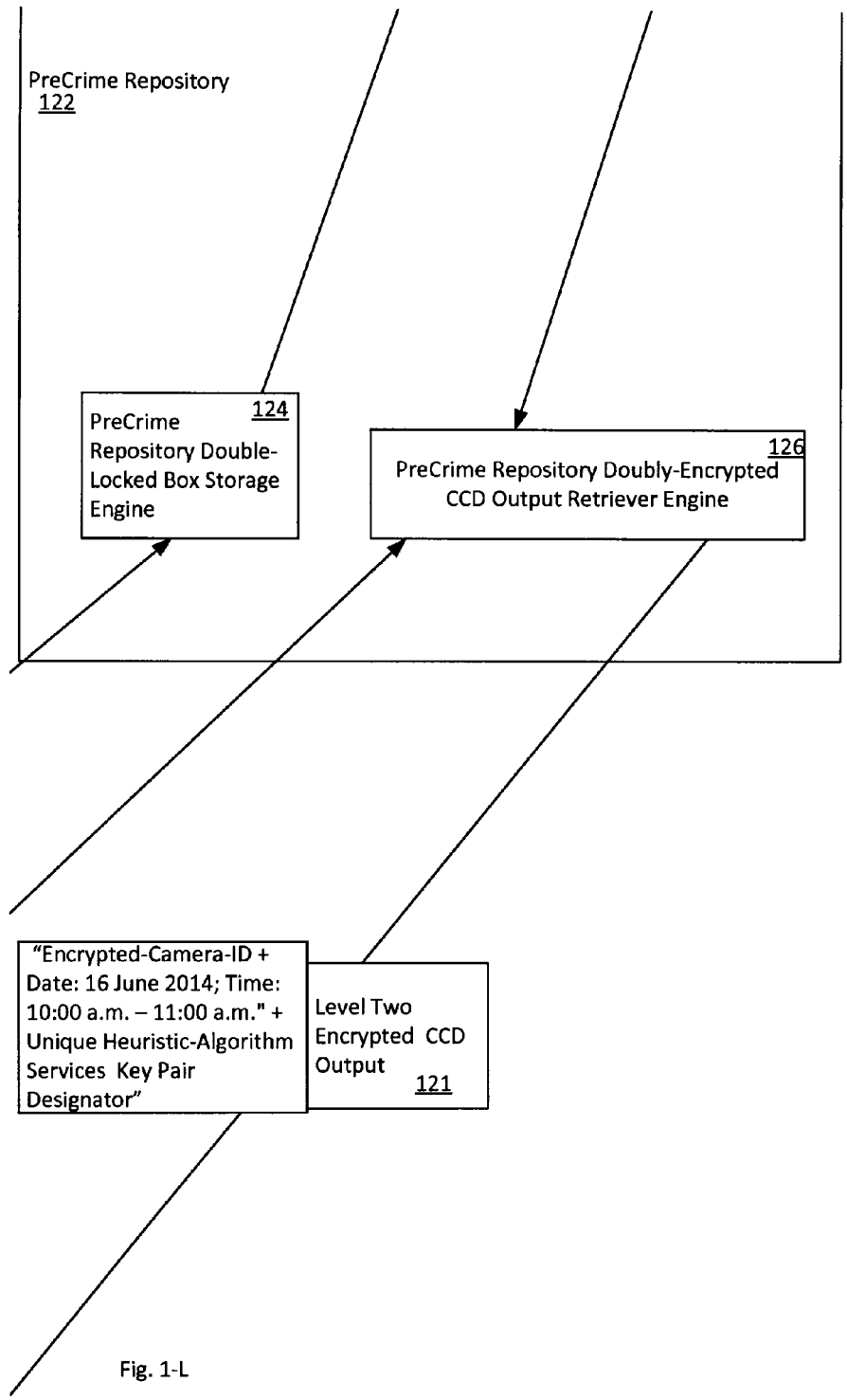
Fig. 1-L

This page is a partial view of a complete view that is extended over several sheets. This page is included so that there is no loss in facility of understanding the view. See 37 C.F.R. 1.84(h)(2). This page is capable of being linked edge to edge with Fig. 1-G above, Fig. 1-N to the right, Fig. 1-S below, and no figure to the left.

Fig. 1-M

"Encrypted-Camera-ID ("String that is Result of Encrypting "Skynet Security Camera Alpha") + Geographic Location of Camera Sent by Skynet Security Services' Automation

Fig. 1-N

163
Department of Treasury Encryted Camera ID + Camera Location Repository Circuitry
(Camera-to-Obscure Co. has Previously Sent Encrypted Camera IDs associated with Various Locations at Various Times Here for another Level of Security)

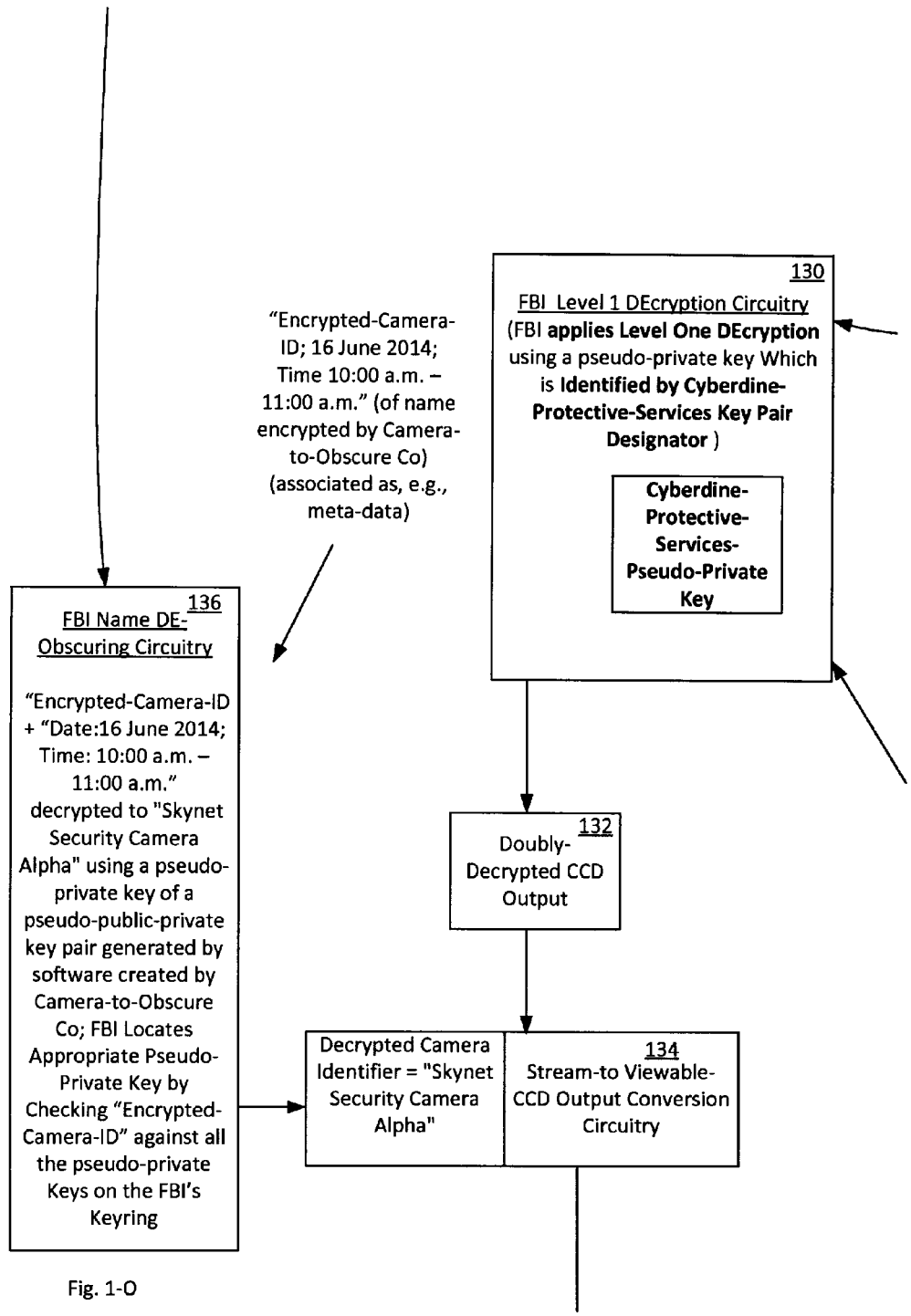
Fig. 1-O

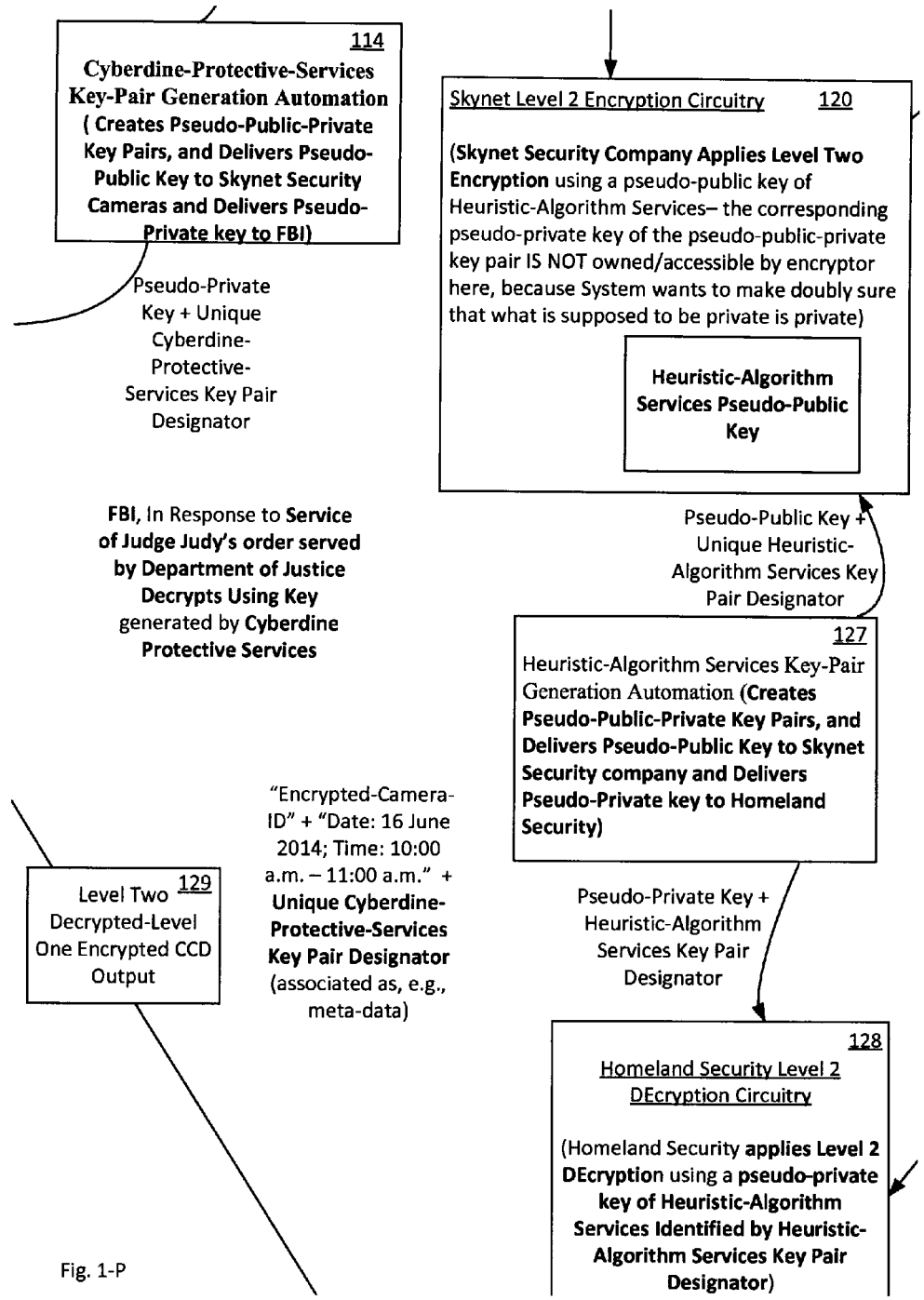
Fig. 1-P

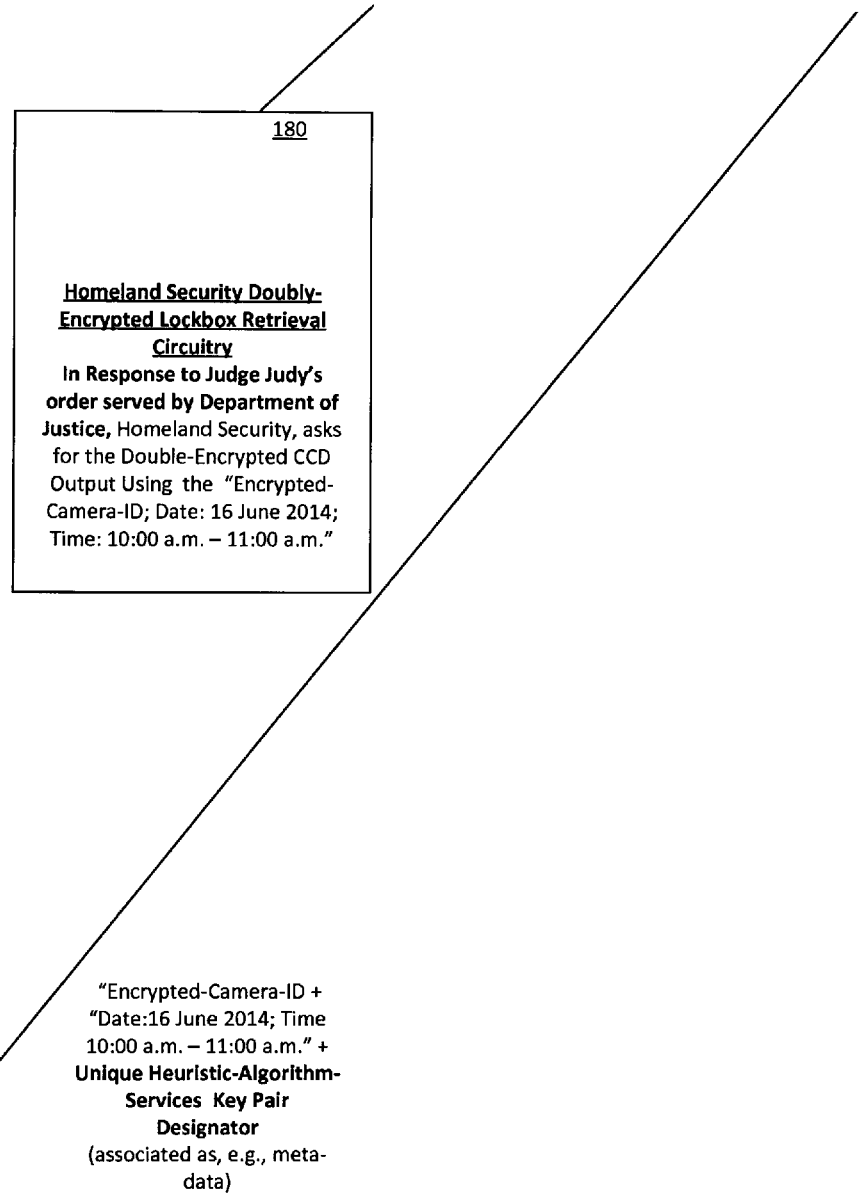
Fig. 1-Q

This page is a partial view of a complete view that is extended over several sheets. This page is included so that there is no loss in facility of understanding the view. See 37 C.F.R. 1.84(h)(2). This page is capable of being linked edge to edge with Fig. 1-L above, Fig. 1-Q to the left, Fig. 1-X below, and no figure to the right.

Fig. 1-R

This page is a partial view of a complete view that is extended over several sheets. This page is included so that there is no loss in facility of understanding the view. See 37 C.F.R. 1.84(h)(2). This page is capable of being linked edge to edge with Fig. 1-M above, Fig. 1-T to the right, no figure below, and no figure to the left.

Fig. 1-S

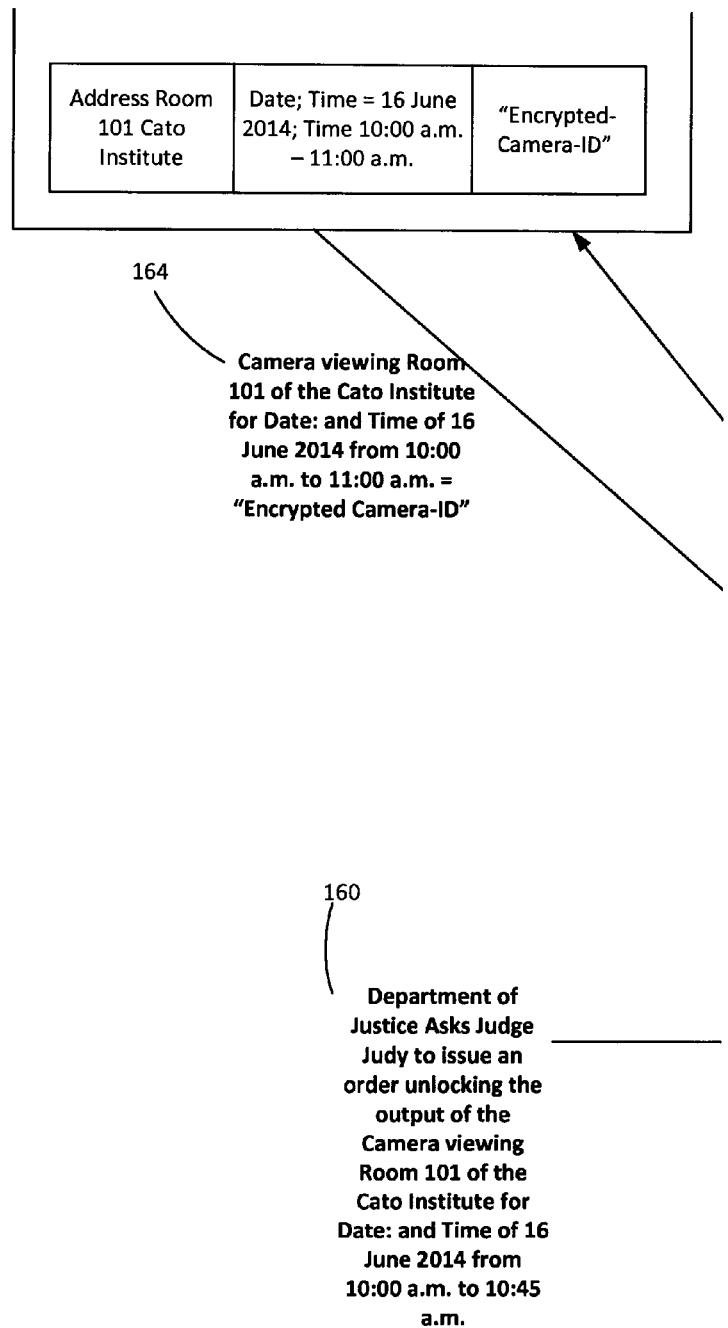
Fig. 1-T

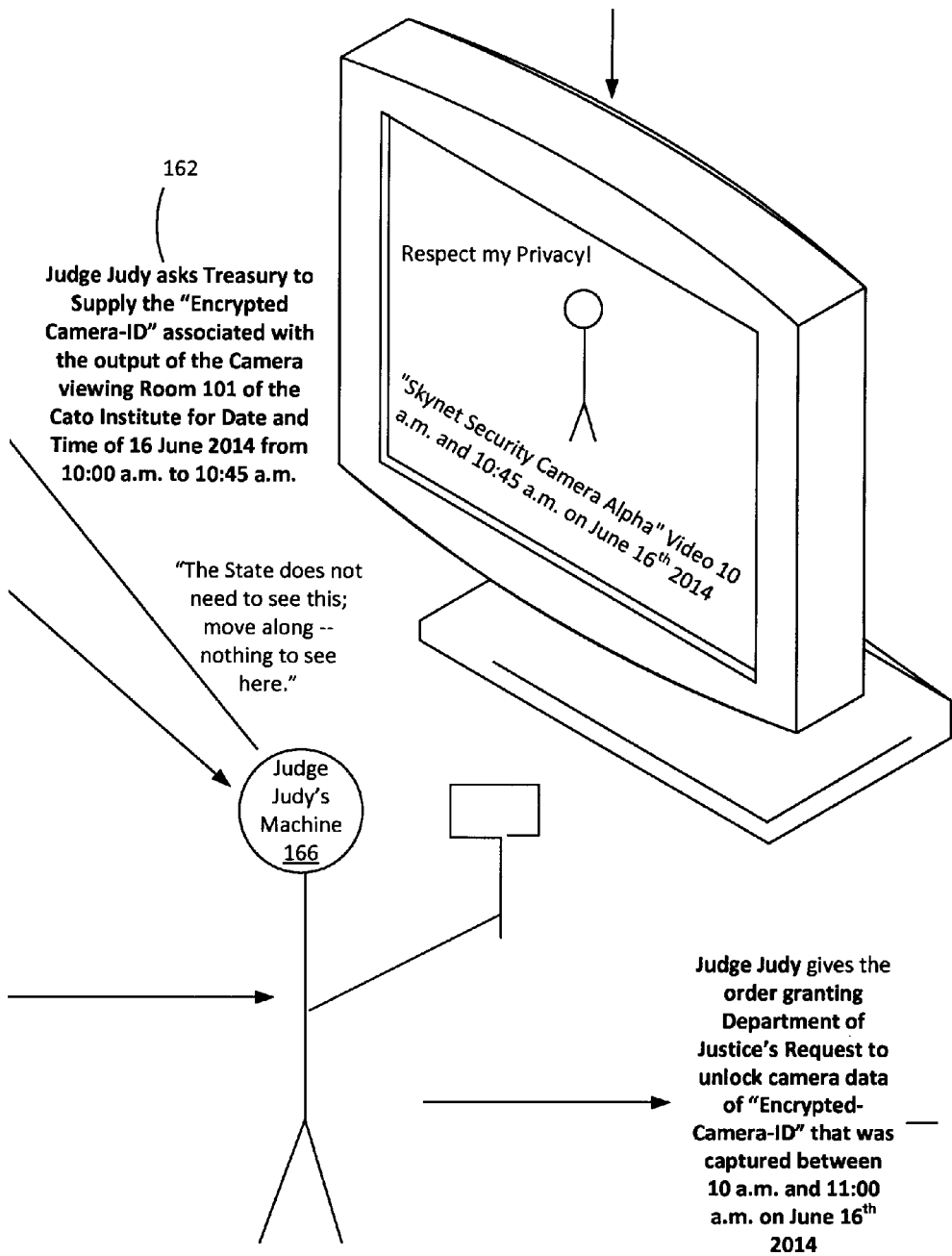
Fig. 1-U

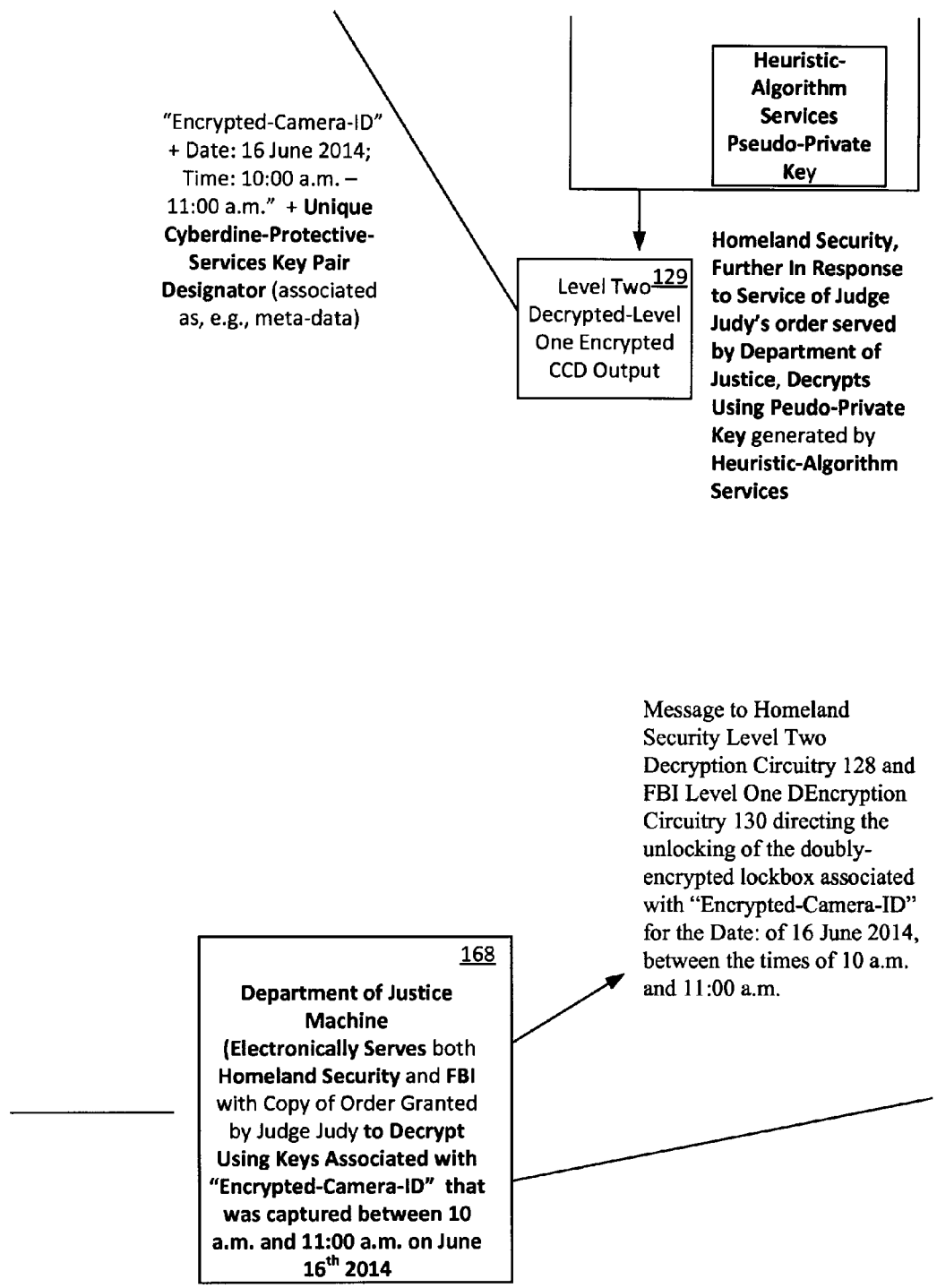
Fig. 1-V message to Homeland
Security Doubly-Encrypted
Lockbox Retrieval Circuitry
180 directing the retrieval of
the doubly-encrypted lockbox
associated with "Encrypted-
Camera-ID" for the Date: of
16 June 2014, between the
times of 10 a.m. and 11:00
a.m.

Note: since people may ask for double encrypted CCD Output days or years after it is captured, there will either need to be tracking/storage of the key pairs for first/second encryptions or cycling of the key pairs.

Fig. 1-W

This page is a partial view of a complete view that is extended over several sheets. This page is included so that there is no loss in facility of understanding the view. See 37 C.F.R. 1.84(h)(2). This page is capable of being linked edge to edge with Fig. 1-R above, Fig. 1-W to the left, no figure below, and no figure to the left.

Fig. 1-X

RIGHT OF INDIVIDUAL PRIVACY AND PUBLIC SAFETY PROTECTION VIA DOUBLE ENCRYPTED LOCK BOX

BRIEF DESCRIPTION OF THE FIGURES

In accordance with 37 CFR 1.84(h)(2), FIG. 1 shows "a view of a large machine or device in its entirety . . . broken into partial views . . . extended over several sheets" labeled FIG. 1-A through FIG. 1-X (Sheets 1-24). The "views on two or more sheets form, in effect, a single complete view, [and] the views on the several sheets . . . [are] so arranged that the complete figure can be assembled" from "partial views drawn on separate sheets . . . linked edge to edge," in that (i) a "smaller scale view" is "included showing the whole formed by the partial views and indicating the positions of the parts shown," see 37 CFR 1.84(h)(2), and (ii) the partial-view FIGS. 1-A to 1-X are ordered alphabetically, by increasing column from left to right, as shown in the following table (with further orientation as indicated by tab-slot instructions on the partial-view figures):

| | | | | | |
|---|---|---|---|---|---|
| FIG. 1-A | FIG. 1-B | FIG. 1-C | FIG. 1-D | FIG. 1-E | FIG. 1-F |
| FIG. 1-G | FIG. 1-H | FIG. 1-I | FIG. 1-J | FIG. 1-K | FIG. 1-L |
| FIG. 1-M | FIG. 1-N | FIG. 1-O | FIG. 1-P | FIG. 1-Q | FIG. 1-R |
| FIG. 1-S | FIG. 1-T | FIG. 1-U | FIG. 1-V | FIG. 1-W | FIG. 1-X |

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

With reference now to the Figures and with reference now to FIG. 1, FIG. 1 shows a partially schematic diagram of an environment(s) and/or an implementation(s) of technologies described herein. FIG. 1 depicts atypical person 100 resident within the confines of Room 101 of the Cato Institute. FIG. 1 illustrates that Room 101 of the Cato Institute is surveilled by camera 102, where camera 102 has an associated identifier (e.g., name) of "Skynet Security Camera Alpha."

FIG. 1 illustrates that Camera-to-Obscure Co. Circuitry 104 creates a pseudo-public-private key pair. FIG. 1 shows that Camera-to-Obscure Co. Circuitry 104 transmits Camera-to-Obscure Co. generated Pseudo-Public Key to Skynet Name Obscuring Unit 106. FIG. 1 depicts that the output of Skynet Name Obscuring Unit 106 is "Encrypted-Camera-ID" which is a string that results from encrypting "Skynet Security Camera Alpha" with the pseudo-public key delivered to Skynet Name Obscuring Unit 106 by Camera-to-Obscure Co. Circuitry 104. FIG. 1 further depicts that Camera-to-Obscure Co. Circuitry 104 transmits Camera-to-Obscure Co. generated Pseudo-Private Key to FBI Name DE-Obscuring Circuitry 136, which as show herein, in one implementation, will subsequently attempt to unlock various received encrypted names by trying to decrypt the received encrypted names via trying various pseudo-private keys on the FBI Name DE-Obscuring Circuitry 136's private key chain until the encrypted name is unlocked; that is, in a fashion analogous to a human trying similar looking keys on his key chain to find the key that opens the front door to his house. In other implementations FBI Name DE-Obscuring Circuitry 136 uses a Unique Camera-to-Obscure Co. Key pair designator (not shown), analogous to the ways unique key pair designators are used as described elsewhere herein with respect to, for example, the pseudo-public-private key pairs respectively generated by Cyberdine Protective Services and Heuristic Algorithm Services such as described herein; such alternate implementations for the FBI Name DE-Obscuring Circuitry 136 that use a Unique Camera-to-Obscure Co. Key pair designator are not shown in the drawings for sake of clarity but can be understood in light of at least the reference examples herein.

FIG. 1 illustrates that Skynet Name Obscuring Unit 106 transmits output—"Encrypted-Camera-ID"—which is the string that is the result of encrypting "Skynet Security Camera Alpha" with the pseudo-public key of the pseudo-public-private key pair generated by Camera-to-Obscure Co. circuitry 104—plus a date and time window for which "Encrypted-Camera ID" is good (e.g., Jun. 16, 2014 from 10:00 a.m. to 11:00 a.m.) to Skynet Level One Encryption Circuitry 110. In some implementations, the date and time is optional, and Skynet Level One Encryption Circuitry 110 just appends the appropriate date and time during which CCD output 112 is received from camera 102.

FIG. 1 shows that in one implementation CCD output 112 from camera 102 feeds—via a hardwired connection—directly into Skynet Level One Encryption Circuitry 110 as a stream—not a frame. Thus, in one implementation such as illustrated herein, at no point can camera 102's output be intelligibly accessed until/unless several different legal entities—controlling very different encryption/decryption automation the keys to which encryption/decryption are at no time held by a single party who can decrypt and see the camera output—work in a transparent and coordinated fashion.

FIG. 1 shows atypical person 100 (e.g., one with an alternative lifestyle) who just wants to be left alone but is aware that camera 102—"Skynet Security Camera Alpha"—is surveilling Room 101 of the Cato Institute where atypical person 100 is resident. Accordingly, atypical person 100 is depicted as saying "respect my privacy, and keep your intrusive cameras off my body!"

In one implementation, the public safety is served by constant camera surveillance of Room 101 of the Cato Institute, but atypical person 100 has legitimate concerns as to how such surveillance data might be used. To allay atypical person 100's concerns, illustrated is that CCD output 112 of camera 102 is clocked directly into Skynet Level One Encryption Circuitry 110 as a stream (e.g., such that it can't typically be viewed as video data), which in one implementation immediately encrypts the stream of CCD output 112 using a pseudo-public key generated by Cyberdine-Protective-Services Key-Pair Generation Automation 114.

Continuing to refer to FIG. 1, illustrated is that Cyberdine-Protective-Services Key-Pair Generation Automation 114 creates pseudo-public-private key pairs. Shown is that Cyberdine-Protective-Services Key-Pair Generation Automation 114 delivers the pseudo-public key along with a Unique Cyberdine-Protective-Services Key Pair Designator to Skynet Level One Encryption Circuitry 110 (as show herein Unique Cyberdine-Protective-Services Key Pair Designator will ultimately be utilized to coordinate the pseudo-public and pseudo-private keys by two different and unique legal entities; that is, the unique designator will allow different entities, which are "blind" to the pairing of the pseudo-public and pseudo-private keys, to subsequently use the correct pseudo-private key to decrypt that which was encoded with the corresponding pseudo-public key). Skynet Level One Encryption Circuitry 110 is depicted as under the legal control and administration of Skynet Security Company.

FIG. 1 shows that Cyberdine-Protective-Services Key-Pair Generation Automation 114 delivers the pseudo-private key along with a unique Cyberdine-Protective-Services Key Pair Designator which serves to identify the pseudo-public-private key pair of which the pseudo-private key forms a part to Federal Bureau of Investigation ("FBI") Level One DEcryption Circuitry 130.

FIG. 1 illustrates that while Cyberdine Protective Services has legal control and administration of both keys of the pair, as well as the Cyberdine-Generated Unique Key Pair Designator which serves to identify/coordinate the key pair, Cyberdine Protective Services does not have access to CCD output 112 of camera 102. FIG. 1 shows that when Skynet Level One Encryption Circuitry 110 encrypts CCD output 112 of camera 102 with the Cyberdine-Security-Services generated pseudo-public key, Skynet has no legal control, administration, or possession of the corresponding Cyberdine-Security-Services generated pseudo-private key which could be used to unlock the encryption of CCD output 112 of camera 102 that was/is instantiated by Skynet Level One Encryption Circuitry 110. Cyberdine-Protective-Services Key-Pair Generation Automation 114 is depicted as under the legal control and administration of Cyberdine Protective Services Company which is separate and apart from Skynet Security Company.

FIG. 1 illustrates that the system ensures that Skynet Security Company cannot see any image because it only holds the pseudo-public key of a pseudo-public-private key pair that has been generated by another legal entity, Cyberdine Protective Services Company.

FIG. 1 shows that, in one implementation, Skynet Level One Encryption Circuitry 110, after receipt of "Encrypted-Camera-ID" which is the string that is result of encrypting "Skynet Security Camera Alpha" plus a date and time window for which "Encrypted-Camera ID" is good (e.g., Jun. 16, 2014 from 10:00 a.m. to 11:00 a.m.) from Skynet Name Obscuring Unit 106, encrypts CCD output 112 of camera 102 that occurred on Jun. 16, 2014 from 10:00 a.m. to 11:00 a.m. via the pseudo-public key of the pseudo-public-private key pair generated by Cyberdine Protective Services Company. Thereafter, illustrated is that Skynet Level One Encryption Circuitry 110 associates the Level One encryption of CCD output 112 of camera 102 with meta-data composed of "'Encrypted-Camera-ID'+"Date: Jun. 16, 2014; Time: 10:00 a.m.-11:00 a.m."+"Unique Cyberdine-Protective-Services Key Pair Designator.'" In the instance shown, the "'Encrypted-Camera-ID'+"Date: Jun. 16, 2014; Time: 10:00 a.m.-11:00 a.m."+"Unique Cyberdine-Protective-Services Key Pair Designator'" meta-data is kept outside the Level One encryption applied by Skynet Level One Encryption Circuitry 110, but those skilled in the art will appreciate that in other implementations all or part of such meta-data may be emplaced inside the Level One encryption.

FIG. 1 shows that, subsequently, Skynet Level One Encryption Circuitry 110 sends Level One encrypted CCD output 118, and its associated meta-data of "'Encrypted-Camera-ID'+"Date: Jun. 16, 2014; Time: 10:00 a.m.-11:00 a.m."+"Unique Cyberdine-Protective-Services Key Pair Designator'" to Skynet Level Two Encryption Circuitry 120. FIG. 1 depicts that upon receipt of Level One Encrypted CCD output 118, Skynet Level Two Encryption Circuitry 120 encrypts the received Level One Encrypted CCD output 118 as well as its associated meta-data of "'Encrypted-Camera-ID'+"Date: Jun. 16, 2014; Time: 10:00 a.m.-11:00 a.m."+"Unique Cyberdine-Protective-Services Key Pair Designator'" using a pseudo-public key of a pseudo-public-private key pair that has been generated by another legal entity, Heuristic-Algorithm Services, thus creating a Level Two encryption of Level One Encrypted CCD output 118. With reference now back to CCD output 112 of camera 102 at this point FIG. 1 shows that the Level Two encryption of Level One Encrypted CCD output 118 is a doubly-encrypted version of CCD output 112 of camera 102.

FIG. 1 illustrates that the system ensures that Skynet Level Two Encryption Circuitry 120 can only encrypt because it holds only the pseudo-public key of a pseudo-public-private key pair that has been generated by yet another legal entity, Heuristic-Algorithm Services. FIG. 1 shows that Heuristic-Algorithm Services also generates a "Unique Heuristic-Algorithm-Services Key Pair Designator" that will subsequently be used to "pair" the correct pseudo-private key with the correct pseudo-public key by separate legal entities that are effectively "blind" to the pairing done by Heuristic-Algorithm Services. As shown herein, the pseudo-public-private key pairs and the Unique Heuristic-Algorithm-Services Key Pair Designator are generated by Heuristic-Algorithm-Services Key Pair Generation Automation 127, which is under the legal control and administration of Heuristic-Algorithm Services Company.

Illustrated is that Skynet Security Level Two Encryption Circuitry 120 thereafter associates the meta-data of "'Encrypted-Camera-ID'+"Date: Jun. 16, 2014; Time: 10:00 a.m.-11:00 a.m."+"Unique Heuristic-Algorithm-Services Key Pair Designator'" with the Level Two Encrypted CCD output 121.

Thereafter, illustrated is that Skynet Security Level Two Encryption Circuitry 120 sends the Level Two encrypted CCD output 121, having associated meta-data of "'Encrypted-Camera-ID'+"Date: Jun. 16, 2014; Time: 10 a.m.-11:00 a.m."+"Unique Heuristic-Algorithm-Services Key Pair Designator'" to PreCrime Repository 122.

Shown is that PreCrime Repository Double-Locked Box Storage Engine 124 receives the Level Two Encrypted CCD Output 121, having associated meta-data of "'Encrypted-Camera-ID'+"Date: Jun. 16, 2014; Time: 10 a.m.-11:00 a.m."+"Unique Heuristic-Algorithm-Services Key Pair Designator'" which is then stored as a doubly-encrypted CCD output lockbox indexed by some or all of its meta-data (e.g., indexed by some or all of "'Encrypted-Camera-ID'+"Date: Jun. 16, 2014; Time: 10 a.m.-11:00 a.m."+"Unique Heuristic-Algorithm-Services Key Pair Designator'"). In alternate implementations Level Two Encrypted CCD Output 121 is indexed by "Encrypted-Camera-ID" alone, while in other alternate implementations the Level Two encrypted data is indexed by "Unique Heuristic-Algorithm-Services Key Pair Designator" alone, but FIG. 1 shows meta-data of "'Encrypted-Camera-ID'+"Date: Jun. 16, 2014; Time: 10:00 a.m.-11:00 a.m."+"Unique Heuristic-Algorithm-Services Key Pair Designator'" being used to index for sake of clarity.

It is expected that, in a free society in most instances the doubly-encrypted version of CCD output 112 of camera 102 (e.g., Level Two Encryted CCD Output 121) will never be retrieved and decrypted. That said, it is expected that in some instances public safety might demand that the doubly-encrypted version of CCD output 112 of camera 102 be retrieved and decrypted. For sake of illustration, such an example will now be discussed.

Referring now to the lower left corner of FIG. 1, FIG. 1 depicts, for sake of example, Judge Judy acting subsequent to the event of a crime (e.g., a terrorist attack) committed in the vicinity of Room 101 of the Cato Institute at some time between 10:00 a.m. and 10:45 a.m. on Jun. 16, 2014. FIG. 1 illustrates the Department of Justice asking 160 Judge Judy to issue an order for the unlocking of the camera output from 10:00 a.m. and 10:45 a.m. on Jun. 16, 2014 that is associated with a view of Room 101 of the Cato Institute at the time in question. At this point, neither the Department of Justice nor Judge Judy has a name identifying the camera in question. In response, FIG. 1 shows Judge Judy's machine 166 asking 162 the Department of Treasury Encrypted Camera ID+Camera Location Repository Circuitry 163 (Camera-to-Obscure Co and/or Skynet Security Company is shown as having delivered such information to Treasury at or around the time of such output's creation) for the "Encrypted-Camera-ID" that is associated with the camera that was viewing Room 101 of the Cato Institute on the date of Jun. 16, 2014, between the times of 10:00 a.m. and 10:45 a.m.

In response, FIG. 1 shows the Department of Treasury Encrypted Camera ID+Camera Location Repository Circuitry 163 transmitting 164 to Judge Judy's machine 166 the "Encrypted-Camera-ID" that is associated with the camera at Room 101 of the Cato Institute for the date of Jun. 16, 2014, between the times of 10:00 a.m. and 10:45 a.m. (e.g. the output of camera 102 from 10:00 a.m. to 11:00 a.m. that the system stored). FIG. 1 depicts that Skynet Name Obscuring Unit 106 is shown as having transmitted to Department of Treasury Encrypted Camera ID+Camera Location Repository Circuitry 163 the "Encrypted-Camera-ID" that is associated with the camera having geographic location of Room 101 of the Cato Institute for the date of Jun. 16, 2014, and between the times of 10:00 a.m. and 11:00 a.m. at or around the time "Encrypted Camera ID" was created. That is, at some point prior to Judge Judy's machine 166 making the request.

FIG. 1 depicts that, subsequent to receiving "Encrypted-Camera-ID" that is associated with the camera that was surveilling Room 101 of the Cato Institute on the date of Jun. 16, 2014, and between the times of 10:00 a.m. and 11:00 a.m. (the encrypted envelope that holds the time of interest of 10:00 a.m. to 10:45 a.m.), Judge Judy's machine 166 transmits to Department of Justice Machine 168 an order directing that the output of "Encrypted-Camera-ID" associated with the camera at Room 101 of the Cato Institute for the date of Jun. 16, 2014, between the times of 10:00 a.m. and 11:00 a.m. be unlocked. FIG. 1 illustrates that Department of Justice Machine 168 transmits messages to Homeland Security Doubly-Encrypted Lockbox Retrieval Circuitry 180, Homeland Security Level Two DEcryption Circuitry 128, and FBI Level One DEcryption Circuitry 130 directing the retrieval and/or unlocking of the doubly-encrypted lockbox associated with "Encrypted-Camera-ID" for the date of Jun. 16, 2014, between the times of 10:00 a.m. and 11:00 a.m.

Referring now to the approximate middle-right portion of FIG. 1, FIG. 1 illustrates that, in response to Judge Judy's order the content of which was relayed through the message of Department of Justice Machine 168, Homeland Security Doubly-Encrypted Lockbox Retrieval Circuitry 180 asks PreCrime Repository Circuitry 122 for the files indexed by "'Encrypted-Camera-ID"; "Date: Jun. 16, 2014; Time: 10:00 a.m.-11:00 a.m.'" More specifically, FIG. 1 shows that Homeland Security Doubly-Encrypted Lockbox Retrieval Circuitry 180 transmits a request for the double-encrypted lockbox files having index of "'Encrypted-Camera-ID"+"Date: Jun. 16, 2014; Time: 10 a.m.-11:00 a.m.'" to PreCrime Repository Doubly-Encrypted CCD Output Retriever Engine 126.

FIG. 1 depicts PreCrime Repository Doubly-Encrypted CCD Output Retriever Engine 126 pulling the doubly-encrypted files indexed by "'Encrypted-Camera-ID"+Date: Jun. 16, 2014; Time: 10:00 a.m.-11:00 a.m.+"Unique Heuristic-Algorithm Services Key Pair Designator'" from within PreCrime Repository 122. FIG. 1 illustrates that thereafter PreCrime Repository Doubly-Encrypted CCD Output Retriever Engine 126 sends Level Two Encrypted CCD output 121 along with the associated meta-data of "'Encrypted-Camera-ID"+"Date: Jun. 16, 2014; Time: 10:00 a.m.-11:00 a.m."+"Unique Heuristic-Algorithm Services Key Pair Designator'" to Homeland Security Level Two DEcryption Circuitry 128, which, in view of Judge Judy's order, upon receipt decrypts the received Level Two Encrypted CCD output 121 with the correct pseudo-private key generated by Heuristic Algorithm Services. In one implementation, Homeland Security Level Two DEcryption Circuitry 128 is able to retrieve the correct pseudo-private key to do the decryption via use of Unique Heuristic-Algorithm-Services Key Pair Designator which was previously delivered—by Heuristic-Algorithm Services Key-Pair Generation Automation 127—to Homeland Security Level Two DEcryption Circuitry 128 in association with the pseudo-private key that unlocks the corresponding pseudo-public key that was previously used by Skynet Level Two Encryption Circuitry 120 to encrypt as described herein. Thus, in one implementation Unique Heuristic-Algorithm-Services Key Pair Designator is used to retrieve the correct decryption key, even though the decryptor never had possession/control of the Heuristic-Algorithm pseudo-public key that was used to encrypt.

FIG. 1 shows that Homeland Security Level Two DEcryption Circuitry 128 uses the pseudo-private encryption key of Heuristic-Algorithm Services that is identified by Unique Heuristic-Algorithm-Services Key Pair Designator—which accompanies the doubly encrypted lockbox as meta-data—to undo the Level Two encryption that was previously instantiated by Skynet Level Two Encryption Circuitry 120. Depicted is that in one implementation the decryption yields the Level-Two Decrypted-Level One Encrypted CCD output data 129 (e.g., the Level Two Decryption applied by Skynet Level Two Encryption Circuitry 120 has been unlocked but the data is still encrypted via the Level One encryption previously applied by Skynet Level One Encryption Circuitry 110) and further depicted is that the decryption done by Homeland Security Level Two Decryption Circuitry 128—accomplished via retrieval of the correct key identified by the Unique Heuristic-Algorithm Services Key Pair Identifier—also provides as output the successful decryption of the Unique Cyberdine-Protective-Services Key Pair Designator (which as shown herein had previously been encrypted by Skynet Level Two Encryption Circuitry 120). FIG. 1 depicts that thereafter Homeland Security Level Two DEcryption Circuitry 128 associates as meta-data "'Encrypted-Camera-ID?+Date: Jun. 16, 2014; Time: 10:00 a.m.-11:00 a.m."+ "Unique Cyberdine-Protective-Services Key Pair Designator'" with the Level-Two Decrypted-Level One Encrypted CCD output data 129 (which is still encrypted via the level one encryption previously applied by Skynet Level One Encryption Circuitry 110). FIG. 1 illustrates that Homeland Security Level Two DEcryption Circuitry 128 thereafter sends the meta-data "'Encrypted-Camera-ID"+"Date: Jun. 16, 2014; Time: 10:00 a.m.-11:00 a.m."+"Unique Cyberdine-Protective-Services Key Pair Designator'" in association with the with the Level Two Decrypted-Level One Encrypted CCD output data 129 (which is still encrypted via the level one encryption previously applied by Skynet Level One Encryption Circuitry 110) to FBI Level One Decryption Circuitry 130.

FIG. 1 shows that, FBI Level One DEcryption Circuitry 130 receives the meta-data "'Encrypted-Camera-ID"+"Date: Jun. 16, 2014; Time 10:00 a.m.-11:00 a.m."+"Unique Cyberdine-Protective-Services Key Pair Designator'" in association with the Level-Two Decrypted-Level One Encrypted CCD output data 129 (which is still encrypted via the level one encryption previously applied by Skynet Level One Encryption Circuitry 110). FIG. 1 depicts that FBI Level One DEcryption Circuitry 130 determines that Judge Judy's order, as related through the message of Department of Justice Machine 168, indicates that the data associated with "Encrypted-Camera-ID" is to be unlocked. Accordingly, FIG. 1 illustrates that FBI Level One DEcryption Circuitry 130 uses the received Unique Cyberdine-Protective-Services Key Pair Designator to retrieve the correct Cyberdine-Protective-Services pseudo-private key that corresponds to the Cyberdine-Protective-Services pseudo-public key that Skynet Level One Encryption Circuitry 110 used to encrypt CCD Output 112. FIG. 1 shows that FBI Level One DEcryption Circuitry 130 uses the retrieved Cyberdine-Protective-Services pseudo-private key to unlock the Level One encryption. Thus, FIG. 1 shows FBI Level One DEcryption Circuitry 130 outputting doubly-decrypted CCD output 132 (e.g., the in-the-clear stream of CCD output 112 of camera 102).

FIG. 1 depicts that Stream-to Viewable-CCD Output Conversion Circuitry 134 converts the stream to viewable CCD output (e.g., still or motion image frames) which is securely displayed in Judge Judy's chambers. Depicted is that for an additional level of citizen's right's protection, "Encrypted-Camera-ID" is sent by FBI Level One DEcryption Circuitry 130 to FBI Name DE-Obscuring Circuitry 136 which then, using a pseudo-private key of a pseudo-public-private key pair generated by software created by Camera-to-Obscure Co., decrypts "Encrypted-Camera-ID" to "Skynet Security Camera Alpha" which is then used by Stream-to Viewable-CCD Output Conversion Circuitry 134 to associate the name of the camera with the viewable CCD output.

FIG. 1 illustrates Judge Judy in her Chambers viewing the output of "Skynet Security Camera Alpha" Video of 10:00 a.m. to 10:45 a.m. that was captured on Jun. 16, 2014. Depicted is that Judge Judy determines that atypical person 100 has done nothing wrong, and concludes that the Department of Justice need not see the output. Thus, FIG. 1 shows Judge Judy denying the Department of Justice's request to see the output of the camera viewing Room 101 of the Cato Institute for the date of Jun. 16, 2014 and time from 10:00 a.m. to 10:45 a.m.

Thus as shown herein, atypical citizen 100's rights to privacy, as well as the public's right to safety, are thus protected and/or balanced by the disclosed technologies.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
    accepting an output of a surveillance device;
    encrypting at least a part of the output of the surveillance device with a level-one encryption key whose decryption key is inaccessible by a level-one encryption entity, said encrypting at least a part of the output of the surveillance device with a level-one encryption key associatable with one or more data of level-one encryption circuitry;
    transmitting a level-one encrypted output of the surveillance device;
    receiving the level-one encrypted output of the surveillance device;
    encrypting at least a part of the level-one encrypted output of the surveillance device with a level-two encryption key whose decryption key is inaccessible by a level-two encryption entity, said encrypting at least a part of the level-one encrypted output of the surveillance device with a level-two encryption key associatable with one or more data of level-two encryption circuitry;
    transmitting a level-two encrypted output of the surveillance device;
    receiving the level-two encrypted output of the surveillance device;
    storing the level-two encrypted output of the surveillance device in association with a surveillance device identifier in a form inaccessible by a pre-event repository;
    transmitting the level-two encrypted output of the surveillance device in response to a query containing at least a part of the surveillance device identifier in the form inaccessible by the pre-event repository;
    receiving the level-two encrypted output of the surveillance device;
    decrypting at least a part of the level-two encrypted output of the surveillance device with a level-two decryption key inaccessible by the level-two encryption entity, said decrypting at least a part of the level-two encrypted output of the surveillance device with a level-two decryption key associatable with one or more data of level-two decryption circuitry;
    transmitting a level-one encrypted output of the surveillance device that is a result of said decrypting at least a part of the level-two encrypted output of the surveillance device with a level-two decryption key inaccessible by the level-two encryption entity;
    receiving the level-one encrypted output of the surveillance device;
    decrypting at least a part of the level-one encrypted output of the surveillance device with a level-one decryption key inaccessible by a level-one encryption entity, said decrypting at least a part of the level-one encrypted output of the surveillance device with a level-one decryption key associatable with one or more data of level-one decryption circuitry; and
    presenting an unencrypted output of the surveillance device.

2. A machine comprising:
    a machine configured to create a physical reality of accepting an output of a surveillance device;
    a machine configured to create a physical reality of encrypting at least a part of the output of the surveillance device with a level-one encryption key whose decryption key is inaccessible by a level-one encryption entity;
    a machine configured to create a physical reality of transmitting a level-one encrypted output of the surveillance device;
    a machine configured to create a physical reality of receiving the level-one encrypted output of the surveillance device;
    a machine configured to create a physical reality of encrypting at least a part of the level-one encrypted output of the surveillance device with a level-two encryption key whose decryption key is inaccessible by a level-two encryption entity;
    a machine configured to create a physical reality of transmitting a level-two encrypted output of the surveillance device;
    a machine configured to create a physical reality of receiving the level-two encrypted output of the surveillance device;

a machine configured to create a physical reality of storing the level-two encrypted output of the surveillance device in association with a surveillance device identifier in a form inaccessible by a pre-event repository;

a machine configured to create a physical reality of transmitting the level-two encrypted output of the surveillance device in response to a query containing at least a part of the surveillance device identifier in the form inaccessible by the pre-event repository;

a machine configured to create a physical reality of receiving the level-two encrypted output of the surveillance device;

a machine configured to create a physical reality of decrypting at least a part of the level-two encrypted output of the surveillance device with a level-two decryption key inaccessible by the level-two encryption entity;

a machine configured to create a physical reality of transmitting a level-one encrypted output of the surveillance device that is a result of said decrypting at least a part of the level-two encrypted output of the surveillance device with a level-two decryption key inaccessible by the level-two encryption entity;

a machine configured to create a physical reality of receiving the level-one encrypted output of the surveillance device;

a machine configured to create a physical reality of decrypting at least a part of the level-one encrypted output of the surveillance device with a level-one decryption key inaccessible by a level-one encryption entity; and a machine configured to create a physical reality of presenting an unencrypted output of the surveillance device.

3. The machine of claim 2, wherein the machine further comprises:
at least one of static or sequenced hardware elements.

4. The machine of claim 2, wherein the machine further comprises:
at least one ordered matter element.

5. The machine of claim 4, wherein the at least one ordered matter element further comprises:
at least one logic gate.

6. The machine of claim 5, wherein the at least one logic gate further comprises:
at least one physical device that may be driven to change physical state in order to create a physical reality of Boolean logic.

7. The machine of claim 4, wherein the at least one ordered matter element further comprises:
at least one logic circuit.

8. The machine of claim 7, wherein the at least one logic circuit further comprises:
one or more physical logic gates that may be arranged to form physical logic circuits that may be driven to create a physical reality of one or more logical functions.

9. The machine of claim 8, wherein one or more physical logic gates that may be arranged to form physical logic circuits that may be driven to create a physical reality of one or more logical functions further comprises:
at least one of a multiplexer, a latch, or a register.

10. The machine of claim 8, wherein one or more physical logic gates that may be arranged to form physical logic circuits that may be driven to create a physical reality of one or more logical functions further comprises:
at least one of an arithmetic logic unit, a computer memory, or a bridge.

11. The machine of claim 8, wherein one or more physical logic gates that may be arranged to form physical logic circuits that may be driven to create a physical reality of one or more logical functions further comprises:
at least one central processing unit.

12. The machine of claim 8, wherein one or more physical logic gates that may be arranged to form physical logic circuits that may be driven to create a physical reality of one or more logical functions further comprises:
at least one configuration responsive to a defined Instruction Set Architecture.

13. The machine of claim 8, wherein one or more physical logic gates that may be arranged to form physical logic circuits that may be driven to create a physical reality of one or more logical functions further comprises:
at least one circuit constructed to convert a machine language instruction to at least one of a voltage control, a timing control, a selection control, or an activation control.

14. The machine of claim 4, wherein the at least one ordered matter element further comprises:
at least one integrated electrical circuit.

15. The machine of claim 4, wherein the at least one ordered matter element further comprises:
at least one application specific integrated electrical circuit.

16. The machine of claim 4, wherein the at least one ordered matter element further comprises:
at least one general purpose computer configured by a computer program.

17. The machine of claim 16, wherein at least one general purpose computer configured by a computer program further comprises:
at least one general purpose computer processor operably coupled with a hardware memory having at least a part of the computer program.

18. The machine of claim 2, wherein transmitting a level-one encrypted output of the surveillance device further comprises:
transmitting a level-two decrypted output—which corresponds to the level-one encrypted output of the surveillance device—that is a result of said decrypting at least a part of the level-two encrypted output of the surveillance device with a level-two decryption key inaccessible by the level-two encryption entity.

19. The machine of claim 2, further comprising:
generating a pseudo-public-private key pair composed of a surveillance-device obscuring pseudo-public key and a surveillance-device obscuring pseudo private key.

20. The machine of claim 19, further comprising:
transmitting the surveillance-device obscuring pseudo-public key to a surveillance-device name obscuring circuit.

21. The machine of claim 20, further comprising:
receiving the surveillance-device obscuring pseudo-public key at the surveillance-device name obscuring circuit;
encrypting a surveillance-device identifier with the surveillance-device obscuring pseudo-public key; and
transmitting an encrypted surveillance device identifier to level-one encryption circuitry.

22. The machine of claim 19, further comprising:
transmitting the surveillance-device obscuring pseudo private key to a surveillance-device name deobscuring circuitry.

23. The machine of claim 22, further comprising:
receiving the surveillance-device obscuring pseudo private key at the surveillance-device name deobscuring circuitry;

11 decrypting an encrypted surveillance-device identifier with the surveillance-device obscuring pseudo private key; and transmitting a decrypted surveillance device identifier to a useable content conversion circuit.

24. The machine of claim 23, further comprising:

receiving useable content from the useable content conversion circuit; and presenting the useable content through a user interface.

25. The machine of claim 2, further comprising:

receiving a request for an unlocked output of a surveillance device associated with a particular time and a particular space; and transmitting a request for an encrypted surveillance device identifier associated with the particular time and the particular space.

26. The machine of claim 25, further comprising:

receiving the request for the encrypted surveillance device identifier associated with the particular time and the particular space; and transmitting the encrypted surveillance device identifier in association with a date-time window and a geographic location to a machine associated with the request for the encrypted surveillance device identifier associated with the particular time and the particular space.

27. The machine of claim 26, further comprising:

receiving the encrypted surveillance device identifier in association with a date-time window and a geographic location at the machine associated with the request for the encrypted surveillance device identifier associated with the particular time and the particular space; and transmitting the encrypted surveillance device identifier in association with a date-time window and a geographic location to unlocking request circuitry operably coupled with both level-one encryption circuitry and level two encryption circuitry.

28. The machine of claim 27, further comprising:

transmitting an instruction to unlock an output identified by the encrypted surveillance device identifier in association with the date-time window and the geographic location to level-one encryption circuitry.

29. The machine of claim 27, further comprising:

transmitting an instruction to unlock an output identified by the encrypted surveillance device identifier in association with the date-time window and the geographic location to level-two encryption circuitry.

30. The machine of claim 27, further comprising:

transmitting an instruction to unlock an output identified by the encrypted surveillance device identifier in association with the date-time window and the geographic location to a doubly encrypted lockbox retrieval circuit.

31. The machine of claim 30, further comprising:

receiving an instruction to unlock an output identified by encrypted surveillance device identifier in association with the date-time window and the geographic location at the doubly encrypted lockbox retrieval circuit; and transmitting a request to a pre-event repository for a doubly-encrypted lockbox identified at least in part by the encrypted surveillance device identifier.

32. The machine of claim 31, further comprising:

retrieving a doubly-encrypted lockbox in response to the request to the pre-event repository for a doubly-encrypted lockbox identified at least in part by the encrypted surveillance device identifier; and transmitting the doubly-encrypted lockbox to level-two decryption circuitry.

33. The machine of claim 32, further comprising:

receiving at the level-two decryption circuitry the doubly-encrypted lockbox that was sent in response to the request to the pre-event repository for a doubly-encrypted lockbox identified at least in part by the encrypted surveillance device identifier.

34. The machine of claim 2, wherein decrypting at least a part of the level-two encrypted output of the surveillance device with a level-two decryption key inaccessible by the level-two encryption entity further comprises:

determining a level-two decryption key corresponding to the level-two encryption key whose decryption key is inaccessible by a level-two encryption entity that was used to encrypt at least a part of the level-one encrypted output of the surveillance device.

35. The machine of claim 34, wherein determining a level-two decryption key corresponding to the level-two encryption key whose decryption key is inaccessible by a level-two encryption entity that was used to encrypt at least a part of the level-one encrypted output of the surveillance device further comprises:

obtaining a level-two decryption key inaccessible by the level-two encryption entity.

36. The machine of claim 35, wherein obtaining a level-two decryption key inaccessible by the level-two encryption entity further comprises:

receiving a level-two key-pair designator in association with a level-two decryption key which forms a pair with the level-two encryption key whose decryption key is inaccessible by a level-two encryption entity that was used by level-two encryption circuitry to encrypt at least a part of the level-one encrypted output of the surveillance device from level-two key pair generation automation.

37. The machine of claim 35, wherein obtaining a level-two decryption key inaccessible by the level-two encryption entity further comprises:

determining a level-two decryption key which forms a pair with the level-two encryption key whose decryption key is inaccessible by a level-two encryption entity that was used by level-two encryption circuitry to encrypt at least a part of the level-one encrypted output of the surveillance device by successively attempting to decrypt with one or more decryption keys on a key chain of level-two decryption circuitry.

38. The machine of claim 2, wherein decrypting at least a part of the level-one encrypted output of the surveillance device with a level-one decryption key inaccessible by a level-one encryption entity further comprises:

determining a level-one decryption key corresponding to a level-one encryption key whose decryption key is inaccessible by a level-one encryption entity that was used to encrypt at least a part of the output of the surveillance device.

39. The machine of claim 38, wherein determining a level-one decryption key corresponding to a level-one encryption key whose decryption key is inaccessible by a level-one encryption entity that was used to encrypt at least a part of the output of the surveillance device further comprises:

obtaining a level-one decryption key inaccessible by the level-one encryption entity.

40. The machine of claim 39, wherein obtaining a level-one decryption key inaccessible by the level-one encryption entity further comprises:

receiving a level-one key-pair designator in association with a level-one decryption key which forms a pair with the level-one encryption key whose decryption key is inaccessible by a level-one encryption entity that was used by level-one encryption circuitry to encrypt at least a part of the output of the surveillance device from level-one key pair generation automation.

41. The machine of claim 39, wherein entity further comprises:
    determining a level-one decryption key which forms a pair with the level-one encryption key whose decryption key is inaccessible by a level-one encryption entity that was used by level-one encryption circuitry to encrypt at least a part of the output of the surveillance device by successively attempting to decrypt with one or more decryption keys on a key chain of level-one decryption circuitry.

42. The machine of claim 2, further comprising:
    transmitting an encrypted surveillance device identifier in association with a date-time window and a geographic location to encrypted surveillance device identifier plus surveillance device location repository circuitry.

43. The machine of claim 42, further comprising:
    receiving the encrypted surveillance device identifier in association with the date-time window and the geographic location; and
    storing the encrypted surveillance device identifier in association with the date-time window and the geographic location in a memory of the encrypted surveillance device identifier plus surveillance device location repository circuitry.

* * * * *